(12) United States Patent
Cheng et al.

(10) Patent No.: US 12,111,471 B2
(45) Date of Patent: Oct. 8, 2024

(54) FREE-FORM PRISM-LENS GROUP AND NEAR-EYE DISPLAY APPARATUS

(71) Applicant: Beijing NED+AR Display Technology Co., Ltd., Beijing (CN)

(72) Inventors: Dewen Cheng, Beijing (CN); Qiwei Wang, Beijing (CN)

(73) Assignee: Beijing NED+AR Display Technology Co., Ltd., Beijing (CN)

( * ) Notice: Subject to any disclaimer, the term of this patent is extended or adjusted under 35 U.S.C. 154(b) by 178 days.

(21) Appl. No.: 17/658,651

(22) Filed: Apr. 10, 2022

(65) Prior Publication Data

US 2022/0236572 A1 Jul. 28, 2022

Related U.S. Application Data

(63) Continuation of application No. 16/423,005, filed on May 25, 2019, now Pat. No. 11,327,308, which is a (Continued)

(30) Foreign Application Priority Data

Dec. 8, 2016 (CN) .......................... 201611123106.6

(51) Int. Cl.
*G02B 27/01* (2006.01)
*G02B 5/04* (2006.01)
*G02B 27/09* (2006.01)
*G02B 27/12* (2006.01)
*G06F 3/01* (2006.01)

(52) U.S. Cl.
CPC ............ *G02B 27/0172* (2013.01); *G02B 5/04* (2013.01); *G02B 27/01* (2013.01); *G02B 27/0955* (2013.01); *G02B 27/0972* (2013.01); *G02B 27/12* (2013.01); *G06F 3/011* (2013.01); *G02B 2027/011* (2013.01)

(58) Field of Classification Search
CPC .. G02B 1/11; G02B 17/086; G02B 2027/011; G02B 27/01; G02B 27/0172; G02B 27/0955; G02B 27/0972; G02B 27/12; G02B 27/142; G02B 5/04; G02B 27/017; G02B 27/09; G02B 27/0093; G02B 27/14; G02B 17/08; G02B 2027/0178; G02B 2027/0187; G06F 3/011; G06F 3/01; G06F 3/013
USPC ......... 359/678, 831, 833, 815, 13, 629–634, 359/462, 466
See application file for complete search history.

(56) References Cited

U.S. PATENT DOCUMENTS

| 2005/0237589 | A1* | 10/2005 | Popovich ................ | G02B 5/32 359/23 |
| 2011/0085242 | A1* | 4/2011 | Bryant .................... | G02B 27/30 359/663 |
| 2015/0153573 | A1* | 6/2015 | Komatsu ................ | G02B 27/017 345/8 |

* cited by examiner

*Primary Examiner* — Jie Lei
(74) *Attorney, Agent, or Firm* — Syncoda LLC; Feng Ma

(57) ABSTRACT

A free-form prism-lens group includes: a primary prism, a first auxiliary lens and a second auxiliary lens, the primary prism includes three optical surfaces, the first auxiliary lens is arranged adjacent to the primary prism and is not used for imaging the image light entering the first auxiliary lens; the second auxiliary lens is arranged adjacent to the primary prism and a gap with a predetermined thickness is arranged between the second auxiliary lens and the primary prism, the second auxiliary lens extends in a direction perpendicular to an optical axis to cover an effective aperture of the image light entering the second auxiliary lens from the primary prism.

20 Claims, 6 Drawing Sheets

Related U.S. Application Data continuation of application No. PCT/CN2017/113080, filed on Nov. 27, 2017.

FREE-FORM PRISM-LENS GROUP AND NEAR-EYE DISPLAY APPARATUS

CROSS-REFERENCE TO RELATED APPLICATIONS

This is a continuation of U.S. patent application Ser. No. 16/423,005 filed on May 25, 2019 (now U.S. Pat. No. 11,327,308), which is a continuation of International Appl. No. PCT/CN2017/113080 filed on Nov. 27, 2017, which claims priority to Chinese Pat. Appl. No. 201611123106.6 filed on Dec. 8, 2016. The disclosures of the above-referenced applications are hereby incorporated by reference in their entirety.

BACKGROUND

Near-eye displays (NEDs) have seen tremendous development since the birth of virtual reality (VR) and augmented reality (AR). In recent years, commercial NEDs have become prevalent, and companies such as Samsung, Sony, Epson, and Microsoft have launched their NED products. Since these displays need to be worn on head by users in using, a lightweight and compact form is always appreciated to reduce the load of users.

SUMMARY

The present disclosure relates to an optical system and apparatus for near-eye display. In some examples, there is provided a free-form prism-lens group for use in a near-eye display and a near-eye display apparatus using the free-form prism-lens group.

Various embodiments disclosed herein provide a freeform prism-lens group with good stability and wear resistance without additional protection sheets, and a near-eye display device using the same, including a primary prism and an auxiliary lens, and the primary prism is used for achieving main refraction/reflection function, and the auxiliary lens is used for compensating the rays and providing a relatively flat surface, in order to improve the stability and resistance.

In an aspect, a free-form prism-lens is provided with smooth front and back surfaces, including:
  at least a primary prism having a first freeform surface, a second freeform surface, and a third freeform surface and a first freeform auxiliary lens;
  wherein the first auxiliary lens has a first optical surface proximal to, and with a same shape as, the third freeform surface of the primary prism
  wherein the third freeform surface of the primary prism is coated with a beam splitter film having predetermined beam splitting ratio, wherein the first auxiliary lens has a second opposing optical surface distal from the primary prism that is planar, aspheric, or spherical with a curvature radius greater than 100 mm. In some embodiments, wherein a second auxiliary lens is included, wherein the second auxiliary lens has a first surface proximal to, and with a same shape as, the first freeform surface of the freeform primary prism.

In some embodiments, the first auxiliary lens is coupled to the freeform primary prism by gluing together.

In some embodiments, there is a gap with a predetermined thickness of not more than 1 mm is configured between the first surfaces of the second auxiliary lens and the first surface of the freeform primary prism.

In some embodiments, the gap is an airgap.

In some embodiments, the second auxiliary lens and the freeform primary prism are removably coupled together.

In some embodiments, the second auxiliary lens has a second surface distal from the freeform primary prism, wherein the second surface of the second auxiliary lens has an identical shape as the second optical surface of the first auxiliary lens, making environmental light with an unchanged direction after passing through the first auxiliary lens, the primary prism, and the second auxiliary lens in sequence.

In some embodiments, the second auxiliary lens has a second surface distal from the freeform primary prism, wherein the second surface of the second auxiliary lens has a different shape with the second optical surface of the first auxiliary lens, thus adding a predetermined diopter compensation to the environmental light.

In some embodiments, the second surface of the second auxiliary lens and the second optical surface of the first auxiliary lens are coated with hardening films and antireflection films.

As a way of reducing the thickness of the apparatus according to some embodiments of the present disclosure, the second optical surface of the first auxiliary lens and the second surface of the second auxiliary lens do not extend beyond an outer edge of the primary prism in an optical axis direction, such that a maximum thickness of the freeform prism-lens group at the optical axis direction is determined by a maximum outer edge thickness of the primary prism at the optical axis direction. As such, the maximum thickness of the freeform prism-lens group is no more than 15 mm according to some embodiments.

In some embodiments, the primary prism has an extended edge portion that extends beyond the freeform surface portion having the beamsplitter film; the extended edge portion has a non-freeform surface; and the freeform portion and the non-freeform surface has a smooth transition.

In another aspect, a near-eye display apparatus is provided having the freeform prism-lens group, further including a micro-display (MD), wherein the MD is positioned over the first freeform surface of the freeform primary prism, wherein light emitted from the MD enters the body of the primary prism via the first freeform surface.

In some embodiments, a controller and a controllable optical filter are included, wherein the controllable optical filter is attached to the second optical surface of the first auxiliary lens, wherein the controllable optical filter is coupled to the controller and is driven with the MD synchronously.

According to various embodiments of the present disclosure, the primary prism made of resinous material is injection-molded with optical resin material with high precision, and the compensating auxiliary lens does not need to be designed individually to reduce the complexity of the surface and the design difficulty. Since both surfaces of the freeform prism-lens group facing to the outside are planar or approximate planar shape. As an optical element in a NED apparatus, it has good extensibility when protecting and attaching external devices, and an attached controllable optical filter may achieve pixel-level control of transmittance, which may effectively decrease the influence of the environmental light on the augmented images, and thus a more vivid and accurate synthesized image can be observed by the eye.

BRIEF DESCRIPTION OF THE DRAWINGS

The foregoing summary and the following detailed description of exemplary embodiments of the present invention may be further understood when read in conjunction with the appended drawings, in which.

DETAILED DESCRIPTION

Embodiments disclosed herein will be fully described with reference to the attached drawings. The present disclosure may, however, be embodied in various forms and should not be constructed as limited to the embodiments set forth herein. Rather, these embodiments are provided so that this disclosure is thorough and complete and will fully convey the scope of the disclosure to those skilled in the art. Moreover, the features of the respective embodiments can also be combined in ways other than the specific embodiments described hereafter, and the technical solutions based on such combination will still fall within the scope of the present disclosure.

The inventors of the present disclosure have recognized that, employing specifically-designed freeform optical elements can be a promising way to achieve VR or AR display applications. Due to the extra degrees of freedom provided by freeform optics, aberration can be better corrected and improved display quality can be achieved, and the weight and size of the optical element used in the NED system can be reduced. For manufacture considerations, freeform prisms made of resin materials (e.g., polymethyl methacrylate, PMMA) can be massively produced by injection molding technique to lower production costs. However, optical plastics are inferior to optical glasses in the aspect of abrasive resistance. Hence, processes such as hardening treatment, under complex industrial environment and during the long time of normal use, are taken to improve the abrasive resistance and stabilization of the plastic optical elements.

Figure 1:
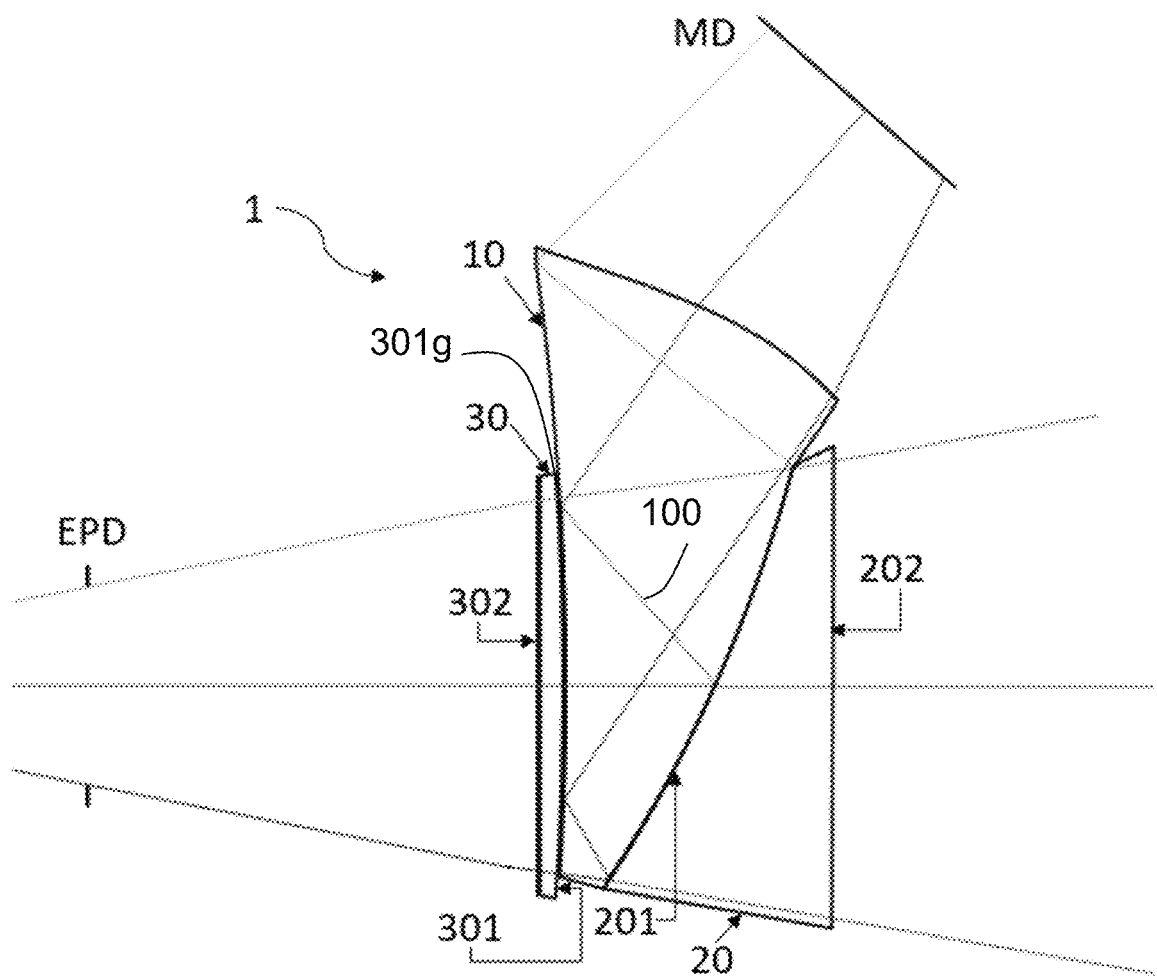
FIG. 1 schematically illustrates the vertical cross-section of the freeform prism-lens group according to some embodiments.

FIG. 1 shows an embodiment of the disclosure. The freeform prism-lens group 1 has at least a primary prism 10 for image with freeform surface(s) and a first auxiliary lens 20 for compensation, wherein each freeform optical element has at least two valid optical surfaces and other auxiliary surfaces to form a valid element. The primary prism 10 has at least three valid optical surfaces, which magnifies the image displayed through a MD by refraction and/or reflection.

Figure 2:
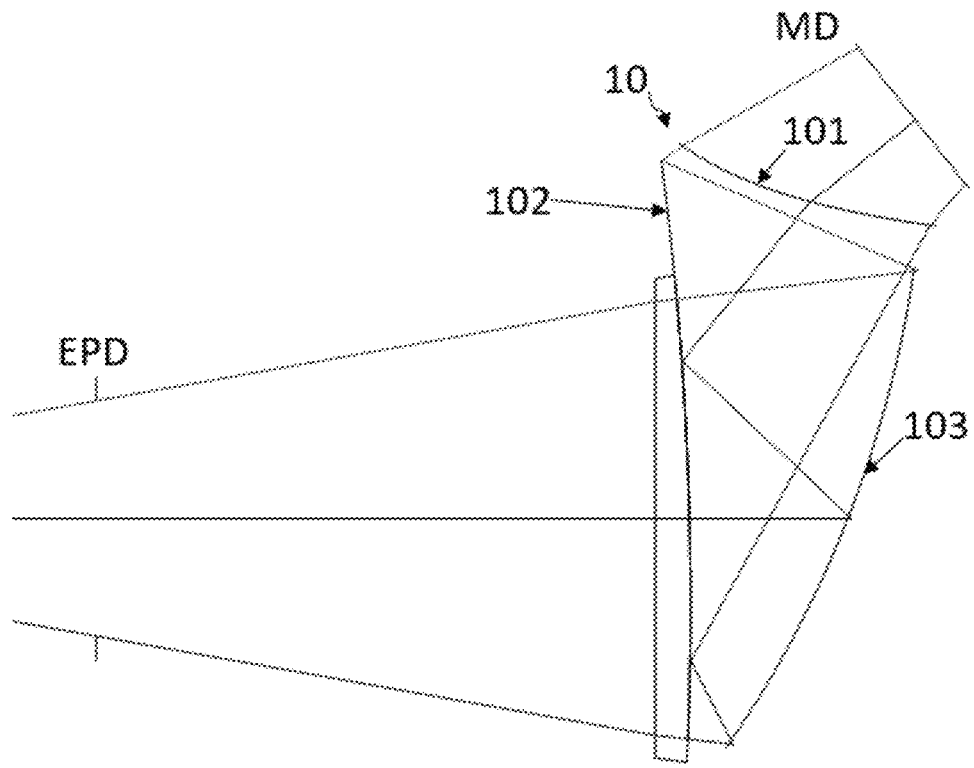
FIG. 2 schematically illustrates the vertical cross-section of the primary prism in FIG. 1.

As shown in FIG. 2, the primary prism 10 may include three optical surfaces labeled as 101, 102, and 103, respectively. The first optical surface 101 faces the MD. Light emitted from MD passes through the first optical surface 101 and enters the body of primary prism 10 by refraction, and then propagate to the second optical surface 102. The light is total internal reflected after the first time to reach the second optical surface 102. The reflected light from the second optical surface 102 is reflected by the third optical surface 103 and then reach the second optical surface 102 for the second time. After reaching the second optical surface 102 for the second time, the light passes through the second optical surface 102 to the position of exit pupil EPD. The second optical surface 102 of the primary prism 10 is required to satisfy the condition of total internal reflection for light reaches the first time. The second optical surface 102 and the third optical surface 103 are freeform surfaces. The third optical surface 103 coated with a beam splitter film, e.g., a half film or a film with some other splitting ratio reflects the light into the internal of the primary prism 10. The transmittance of the beamsplitter film can be determined according to the brightness of the MD to ensure the effective use of light, and balance the brightness of the light of the MD and the brightness of the environmental light rays to improve the contrast of the displayed AR image.

The primary prism 10 is the major element in the freeform prism-lens group 1 in the aspect of obtaining an enlarged virtual image of the MD. By the curvatures of the second optical surfaces 102 and the third optical surface 103 of the primary prism 10 work in conjunction, the image on the MD could be enlarged. The light passed through the third optical surface 103 that could not reach the user's eyes, as the loss of the optical energy, has no contribution for the image that the user watches. As a result, the light of the MD is refocused by the primary prism 10, and an image from MD seen at EP appears to be emitted from some feet away to the eye rather than from about one inch away where the MD is actually placed.

Those of ordinary skill in the art can appreciate that, as shown in FIG. 2, it is a preferred embodiment to use the way of three freeform surfaces of the primary prism 10 to enhance the ability of enlarging the image and the image aberration adjustment, but it is not limiting. The three effective optical surfaces of the primary prism 10 can be other types of surfaces respectively, e.g. only the third optical surface 103 is the freeform surface, and for the convenience of manufacturing the first optical surface 101 and the second optical surface 102, they can be other types of surfaces. For example, the first optical surface 101 can adopt a spherical surface or aspheric surface, or the second optical surface 102 can adopt a spherical surface or aspheric surface if the second optical surface 102 can satisfy the condition of total internal reflection for the light first reaching it. Spherical or aspherical surface is conducive to manufacturing and reducing the cost, but the aberration correction ability of spherical or aspherical surface for light of a magnified image is significantly lower than the surface of the freeform surface. As such, the type of surface that holds the third optical surface 103 as a freeform surface is particularly important.

Based on the focusing of the valid optical surfaces of the primary prism and inconsistency in the thickness of the primary prism, the environmental light rays connecting to the human eyes through the primary prism will cause deformation of the environmental light rays imaging. Therefore, the auxiliary lens needs to be set. The first auxiliary lens 20 is placed on one side of the primary prism 10. In this embodiment, as shown in FIG. 1, the first auxiliary lens 20 is placed outside of the primary prism 10, e.g., on the side close to the environment. The first optical surface 201 of the first auxiliary lens 20 adjacent to the primary prism 10 is an optical surface having an identical shape with the third optical surface 103 of the primary prism 10, and is close to the third optical surface 103 of the primary prism 10 by means of gluing together. The second optical surface 202 of the first auxiliary lens 20 facing the environment is also an optical surface for transmitting the environmental light rays into the first auxiliary lens 20 and the primary prism 10. Because of the second optical surface 202 of the first auxiliary lens 20 facing the environment, preferably, the second optical surface 202 is a planar surface to facilitate protective measures, such as coated with protective film layer. In some embodiments, the image light 100 of the MD enters the first auxiliary lens 20 is not used for imaging, therefore, the material for the first auxiliary lens 20 can be different with that for the primary prism, e.g., the first auxiliary lens may not use a special material that is advantageous for reducing optical aberration to reduce the difficulty of the fabrication and the cost, but it is also feasible that the first auxiliary lens and the primary prism use the same material. For the convenience of assembling and positioning, the primary prism 10 is provide positioning structure such as a positioning slot, and the positioning structure can match the shape of the first auxiliary lens 20 or the positioning structure on the first optical surface 201 of the first auxiliary lens. Therefore, the relative position of the first auxiliary lens 20 and the primary prism 10 can be easily determined, resulting in high-precision alignment after the surface of the primary prism 10 is cemented to the first auxiliary lens 20, and a high image quality of the environmental light rays can be obtained.

In some embodiments, the embodiment of the disclosure may include a second auxiliary lens 30, as illustrated in FIGS. 1 and 2. The second auxiliary lens 30 may be placed on the other side of the primary prism 10, i.e., the first auxiliary lens 20 and the second auxiliary lens 30 are on two different sides of the primary prism 10. The second auxiliary lens 30 may be a compensation for the light in the other side of the freeform prism-lens group 1. The first surface 301 of the second auxiliary lens 30 is an optical surface which has a same shape with the second optical surface 102 of the primary prism 10, and is placed proximal to the second optical surface 102 of the primary prism 10 with an air gap 301g with a predetermined thickness that is no more than 1 mm. To facilitate the assembly, the air gap 301g may be ensured by one or more spacers of predetermined thickness, or by mechanical matching clip and column predetermined lengths with clips and slots wherein clips and columns may be disposed on the second auxiliary lens 30 or the primary prism 10, and the correspondent clips and slots may be disposed on the primary prism 10 or the second auxiliary lens 30. The above-mentioned slots, columns or the clips may be manufactured all-in-one-shape with the primary prism 10 or the auxiliary lens 30, or may be mounted on the primary prism 10 or the second auxiliary lens 30 by other means, e.g., adhering.

The second surface 302 of the second auxiliary lens 30 which is opposite to the first surface 301, i.e., proximal to the exit pupil EP position of this freeform prism-lens group. To achieve a freeform prism-lens group that does not introduce diopter to the environmental light rays, the second surface 302 of the second auxiliary lens 30 has an identical shape with the second optical surface 202 of the auxiliary lens 20 that the surface is face to the environmental light. The second surface 302 of the second auxiliary lens 30 is planar in this embodiment. Since the light from MD is further transmitted through the second auxiliary lens 30 after exiting from the primary prism 10, the auxiliary lens 30 may be further used to correct aberrations, and it is preferable to use the same material as the primary prism 10, and the height of the second auxiliary lens 30 may not extend whole surface of the second optical surfaces 202 in the direction perpendicular to the optical axis, but only covers the effective aperture of the exiting light. Since the second optical surface 202 tends to have a tilt to the EPD at a position away from the optical axis, the auxiliary lens 30 partially-covered can effectively reduce the overall thickness and volume of the freeform prism-lens group 1. In some embodiments, the second optical surface 202 of the first auxiliary lens 20 and the second surface 302 of the second auxiliary lens 30 can be coated with hardening film and anti-reflective film.

FIG. 1 illustrates a structure according to some embodiments to obtain a minimum thickness of the freeform prism-lens group 1. The second optical surface 202 of the first auxiliary lens 20 and the second surface 302 of the second auxiliary lens 30 may not extend an outer edge of the primary prism 10 in the optical axis direction. Such that a maximum thickness of the freeform prism-lens group 1 at the optical direction is determined by a maximum outer edge thickness of the primary prism 10. According to the primary prism 10 adapting the size of MD, the maximum outer edge thickness of the primary prism 10 will change accordingly. For example, the maximum outer edge thickness of the primary prism 10 at the optical axis direction may be effective controlled when the size of the MD is smaller; the maximum thickness of the primary prism 10 in the optical axis direction can be extension properly when the size of MD is larger. That means, the maximum outer edge thickness of the primary prism at the optical axis direction is adapted to extended, i.e. the maximum outer edge thickness of the primary prism is adapted to the MD adapted to the primary prism. For the MD, the effective maximum outer edge thickness is proportional to the size of the MD.

According to the above embodiment of the disclosure, the freeform optical surfaces can be represented by an XYP (XY polynomial) equation:

$$Z = \frac{c(x^2 + y^2)}{1 + sqrt(1 - (1+k)c^2(x^2 + y^2))} + \sum_{n=0}^{66} C_j x^m y^m$$

$$j = [(m+n)^2 + m + 3n]/2 + 1$$

wherein c is the vertex curvature (CUY), k is the conic constant, and $C_j$ is the polynomial coefficient.

Figure 3:
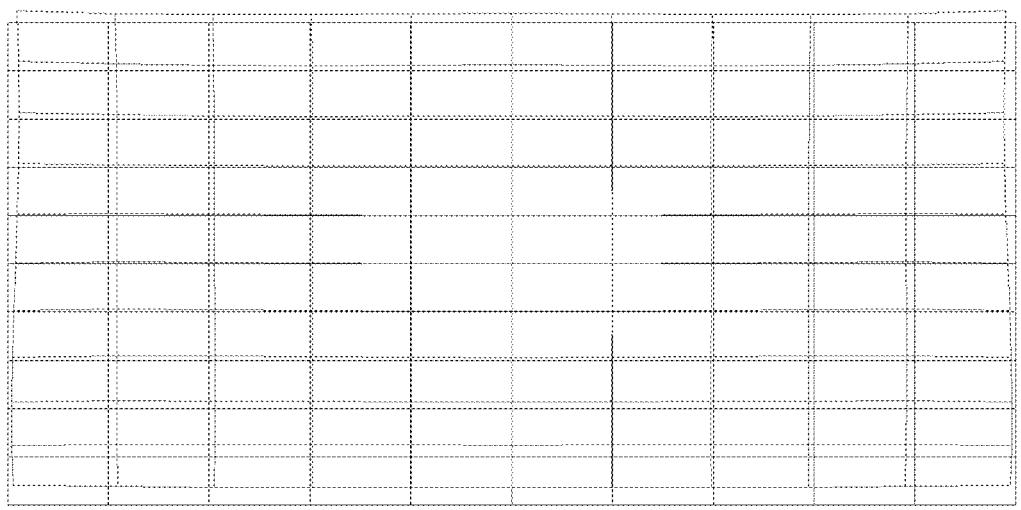
FIG. 3 illustrates the distortion of the displayed image using the freeform prism-lens group in FIG. 1.

For the first example embodiment of the disclosure, from the environmental light to the exit pupil, there are a first auxiliary lens 20, a primary prism 10, and a second auxiliary lens 30 in sequence. All of the three optical elements are freeform optical elements and may be fabricated by high-precision optical resin molded. The first auxiliary lens 20 is glued with the primary prism 10 and there is a 0.5 mm air gap between the second auxiliary lens 30 and the primary prism 10. The whole freeform prism-lens group 1 has a total thickness of not more than 15 mm, and a field-of-view of the freeform prism-lens group 1 is larger than 50°. The first optical surface 201 and the first surface 301 have an identical shape with the third optical surface 103 and the second optical surface 102 of the primary prism 10 respectively, and the second optical surface 202 and the second surface 302 are planar surfaces. The description of the optical surface 201, 202, 203 is omitted in the surfaces of the first embodiment of the disclosure in table 1. Accordingly, for the light provided by the MD used in the first embodiment of the disclosure, the image distortion of the freeform prism-lens group 1 on the EPD is shown in FIG. 3.

TABLE 1

| Surface | Radius of curvature (mm) |
|---|---|
| 302, 202 | Planar (∞) |
| 102, 301 | −130.534623433003 |
| 103, 201 | −44.9621213993141 |
| 101 | −18.4176668625078 |
| MD | Planar (∞) |

TABLE 2

| | surface 103 | surface 101 |
|---|---|---|
| X | 0 | 0 |
| Y | 0 | 0 |
| $X^2$ | −0.00536 | 0.058254 |
| XY | 0 | 0 |
| $Y^2$ | 6.24E−05 | 8.23E−04 |
| $X^3$ | 0 | 0 |
| $X^2Y$ | 4.49E−05 | 9.97E−04 |
| $XY^2$ | 0 | 0 |
| $Y^3$ | −0.00025 | 0.000159 |
| $X^4$ | −5.02E−06 | −3.03E−04 |
| $X^3Y$ | 0 | 0 |
| $X^2Y^2$ | −1.20E−06 | 6.18E−04 |
| $XY^3$ | 0 | 0 |
| $Y^4$ | 2.42E−05 | −1.57E−04 |
| $X^5$ | 0 | 0 |
| $X^4Y$ | −1.03E−06 | −8.79E−05 |
| $X^3Y^2$ | 0 | 0 |
| $X^2Y^3$ | 3.24E−07 | 4.40E−05 |
| $XY^4$ | 0 | 0 |
| $Y^5$ | −1.10E−06 | 1.61E−04 |
| $X^6$ | −2.21E−08 | 1.78E−05 |
| $X^5Y$ | 0 | 0 |
| $X^4Y^2$ | −1.66E−07 | 3.66E−05 |
| $X^3Y^3$ | 0 | 0 |
| $X^2Y^4$ | −8.13E−08 | 6.15E−05 |
| $XY^5$ | 0 | 0 |
| $Y^6$ | 7.61E−08 | −7.74E−06 |
| $X^7$ | 0 | 0 |
| $X^6Y$ | −7.00E−09 | 1.21E−06 |
| $X^5Y^2$ | 0 | 0 |
| $X^4Y^3$ | 3.73E−08 | 1.08E−06 |
| $X^3Y^4$ | 0 | 0 |
| $X^2Y^5$ | −4.08E−08 | −4.94E−06 |
| $XY^6$ | 0 | 0 |
| $Y^7$ | 5.84E−09 | −8.97E−06 |
| $X^8$ | 4.19E−10 | −9.55E−08 |
| $X^7Y$ | 0 | 0 |
| $X^6Y^2$ | 2.83E−09 | −1.63E−06 |
| $X^5Y^3$ | 0 | 0 |
| $X^4Y^4$ | −2.53E−09 | −1.86E−06 |
| $X^3Y^5$ | 0 | 0 |
| $X^2Y^6$ | 6.28E−09 | −1.09E−06 |
| $XY^7$ | 0 | 0 |
| $Y^8$ | −1.88E−09 | 1.03E−06 |
| $X^9$ | 0 | 0 |
| $X^8Y$ | 7.30E−11 | −8.44E−08 |
| $X^7Y^2$ | 0 | 0 |
| $X^6Y^3$ | −2.85E−10 | 1.09E−07 |
| $X^5Y^4$ | 0 | 0 |
| $X^4Y^5$ | 2.19E−10 | −4.56E−09 |
| $X^3Y^6$ | 0 | 0 |
| $X^2Y^7$ | −3.38E−10 | 3.83E−07 |

TABLE 2-continued

| | surface 103 | surface 101 |
|---|---|---|
| $XY^8$ | 0 | 0 |
| $Y^9$ | 5.04E−11 | 1.50E−07 |
| $X^{10}$ | −2.57E−12 | −1.82E−10 |
| $X^9Y$ | 0 | 0 |
| $X^8Y^2$ | −9.01E−12 | 4.05E−08 |
| $X^7Y^3$ | 0 | 0 |
| $X^6Y^4$ | 1.95E−12 | 2.25E−10 |
| $X^5Y^5$ | 0 | 0 |
| $X^4Y^6$ | 1.03E−11 | 6.35E−08 |
| $X^3Y^7$ | 0 | 0 |
| $X^2Y^8$ | −1.04E−11 | −4.96E−08 |
| $XY^9$ | 0 | 0 |
| $Y^{10}$ | 6.81E−12 | −2.42E−08 |

Figure 4A:
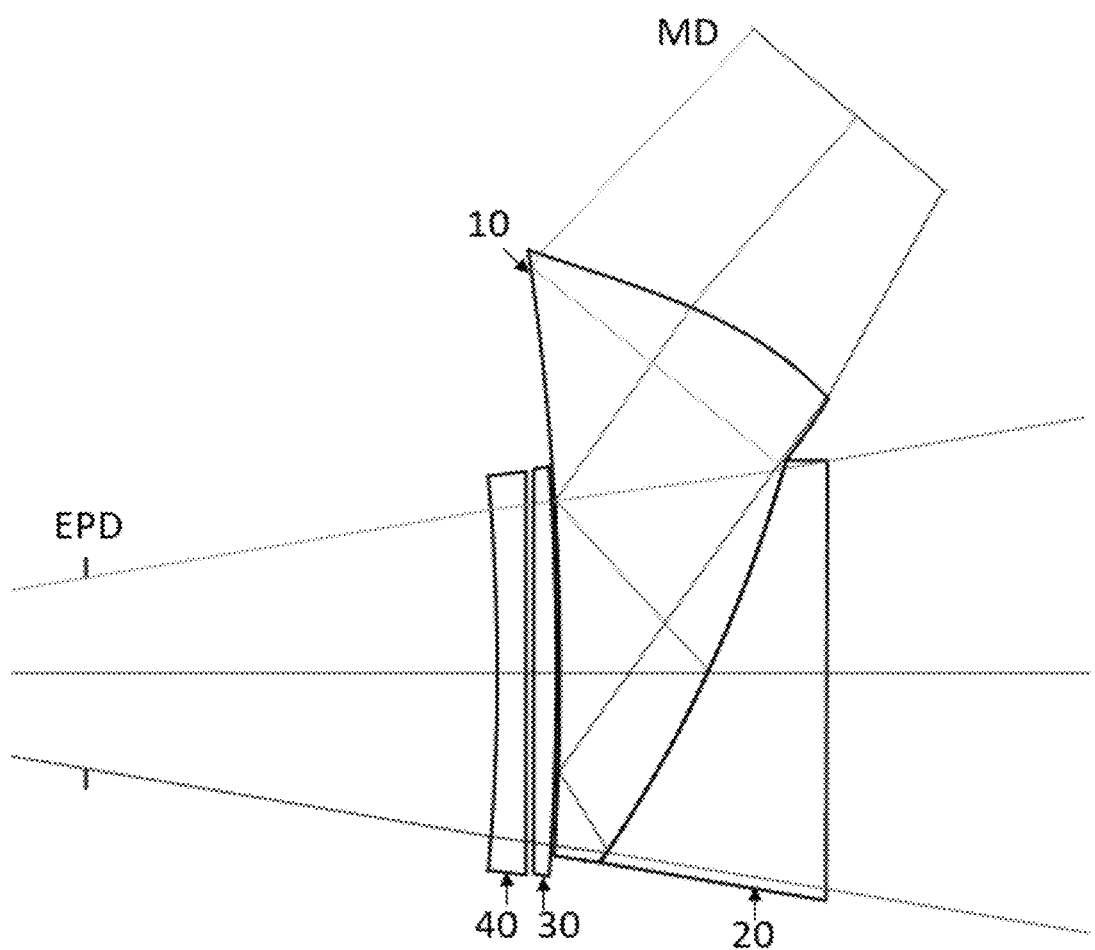
FIG. 4A is a schematic diagram illustrating the vertical cross-section of the freeform prism-lens group in FIG. 1 with a second auxiliary lens with a first amount of diopter compensation provided by the front surface of the second auxiliary lens.

In the first embodiment, the freeform prism-lens group 1 does not provide diopter correction of the transmitted environmental light, since the second surface 302 and the second optical surface 202 are both planar surfaces. Users with myopia or hyperopia may need to wear vision correction lens 40 for vision correction when using the freeform prism-lens group 1, as shown in FIG. 4A. The above-mentioned vision correction lens 40 that is nearer to the exit pupil may be placed on one side of the second auxiliary lens 30, and the side is the opposite side of the second auxiliary lens 30 to the primary prism 10. The vision correction lens 40 may be firmly fixed in front of the eye by means of extra mechanism, e.g., frames and arms of the frames (not shown in FIG. 4A). Or, the vision correction lens 40 (usually two pieces are needed for two eyes) may be made in the form of polarized clips and mounted on the assembled freeform prism-lens group 1 by snap closure of both sides of the clips.

Figure 4B:
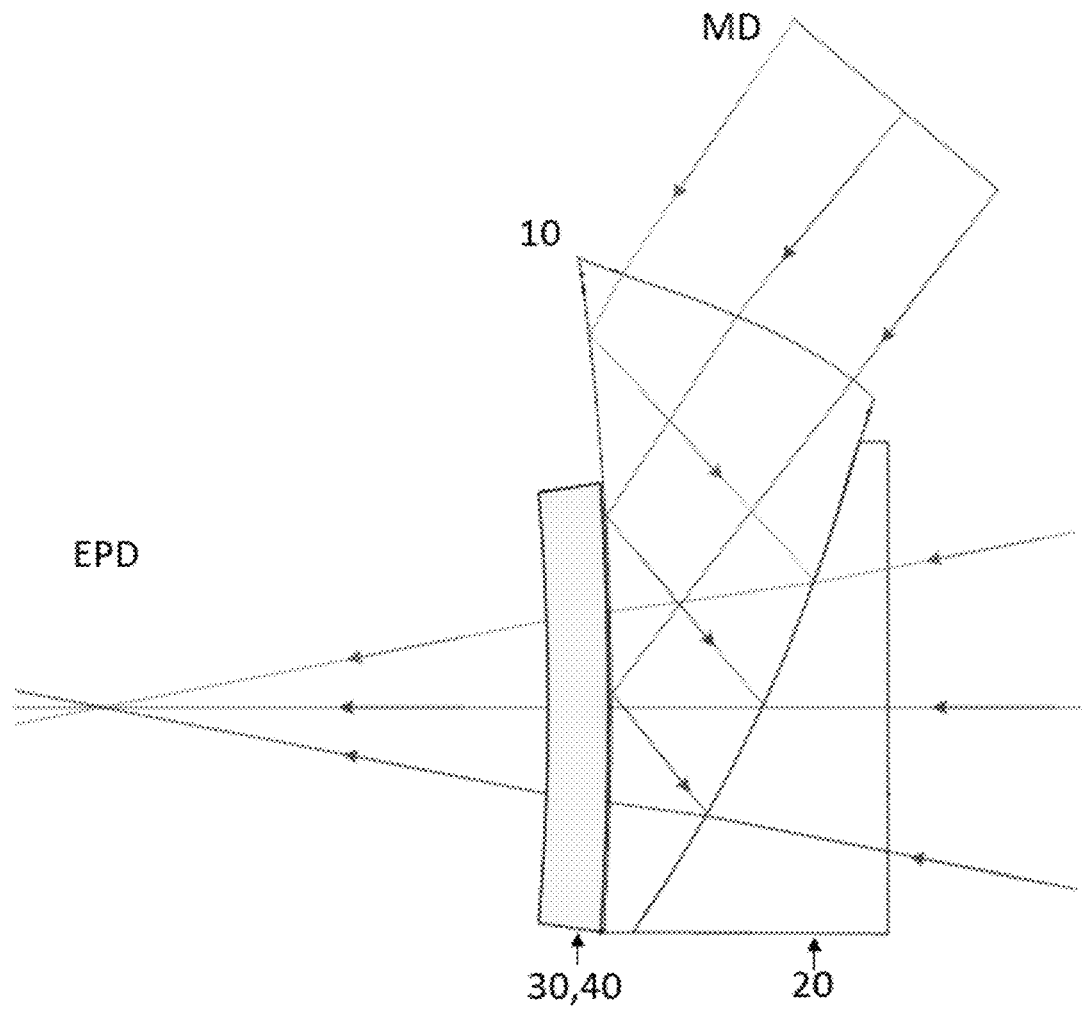
FIG. 4B is a schematic diagram illustrating the vertical cross-section of the freeform prism-lens group in FIG. 1 with a second auxiliary lens with a second amount of diopter compensation provided by the front surface of the second auxiliary lens.

If one surface of the vision correction lens 40 is planar, the vision correction lens 40 may be adhered to the second surface 302 of the second auxiliary lens 30. The adhering method may increase the fixation, but decrease the degree of flexible and also introduces complexity in assembly. A person skilled in this art would know that, in the embodiment of the disclosure, the vision correction lens 40 may be fabricated all-in-one-shape with the second auxiliary lens 30, as shown in FIG. 4B. In this way, the second auxiliary lens 30 with diopter compensation ability is removable couple to the primary prism 10 with a predetermined air gap, and the second surface 302 of the second auxiliary lens 30 has a different shape with the second optical surface 202 of the first auxiliary lens 20, so that the second auxiliary lens 30 with additional vision correction function may fit users with different vision ability.

Figure 4C:
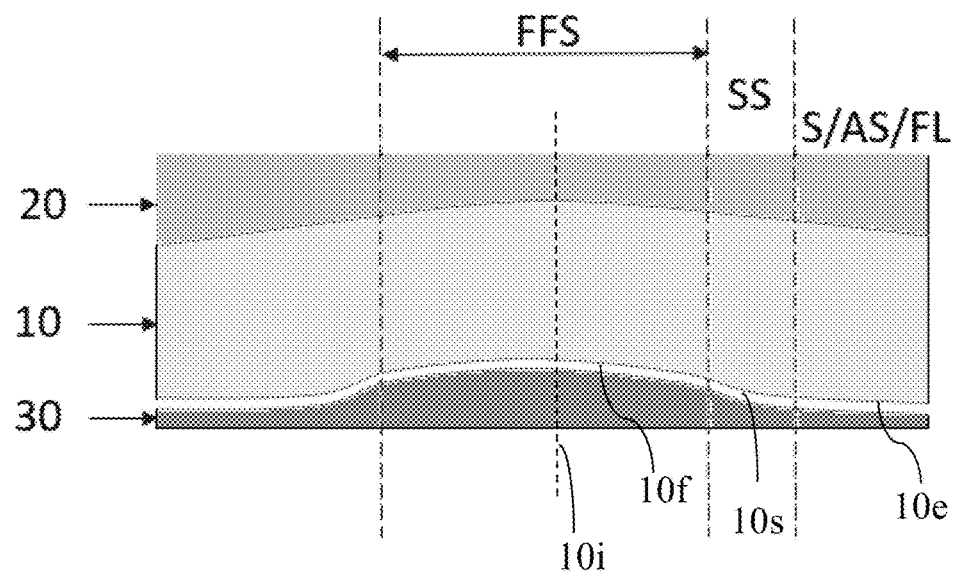
FIG. 4C is a schematic diagram illustrating a zoomed horizontal cross-section of the freeform prism-lens group in FIG. 1 through its optical axis.

Because the second optical surface 202 and the second surface 302 of the freeform prism-lens group 1 in the embodiment have smooth surfaces, the freeform prism-lens group 1 has a good size extensibility. For example, the primary prism 10 needs to effectively magnify the image on the MD without obvious distortion, which calls for curved optical surfaces 102 and 103, and the curved optical surfaces 102 and 103 preventing the freeform prism-lens group 1 from being extended to desired range (e.g., limited by the size of MD, the freeform prism-lens group 1 may not be easily extended to the size of a normal eyeglass with diopter compensation ability, e.g., 70 mm in diameter), because the extension for the edge area according to curvature will result in a distorted image of the MD and a negative effect on both the surface shapes of first and second auxiliary lenses 20 and 30 and the space in front of and behind the primary prism 10 that can be utilized to arrange for the auxiliary lenses 20 or 30. If the freeform prism-lens group 1 has a smooth front surface 302 and a smooth back surface 202 as in the first embodiment, as shown in FIG. 4C that horizontal image along the optical axis, the primary prism 10 may have a portion 10f of the above-mentioned freeform surface (i.e., freeform shape area FFS) on the central area of the second optical surface 102 and the third optical surface 103 having the beam splitter film. For edge portions 10e outside the freeform surface portions 10f, the shape of the surface can be extended easily. Symmetrically about a vertical plane passing through the optical axis 10i, for example, the primary prism 10 may have extended edge portions 10e that are non-freeform surfaces, e.g., spherical, aspheric or planar surfaces (S/AS/FL). The connection area 10s between the freeform portion 10f and the non-freeform surface 10e is optimally a smooth transition area (SS). Accordingly, surfaces 201 and 301 of auxiliary lenses 20 and 30 may have identical shapes with surfaces 102 and 103 of the primary prism 10 respectively in order to obtain smooth surfaces 202 and 302 of the freeform prism-lens group 1. Rays from environmental light will not change direction after passing through the freeform prism-lens group 1, so the user may observe an undistorted environment (equivalent to wearing a plain glass with a certain thickness). The freeform prism-lens group 1 may have a good size extensibility, e.g., freeform prism-lens group 1 can be extended to a desired size but not limited by the size of the micro-display MD. The freeform prism-lens group 1 can be conveniently fabricated to the shape users wanted after the size extended, e.g., similar to conventional vision correction lens.

Figure 5:
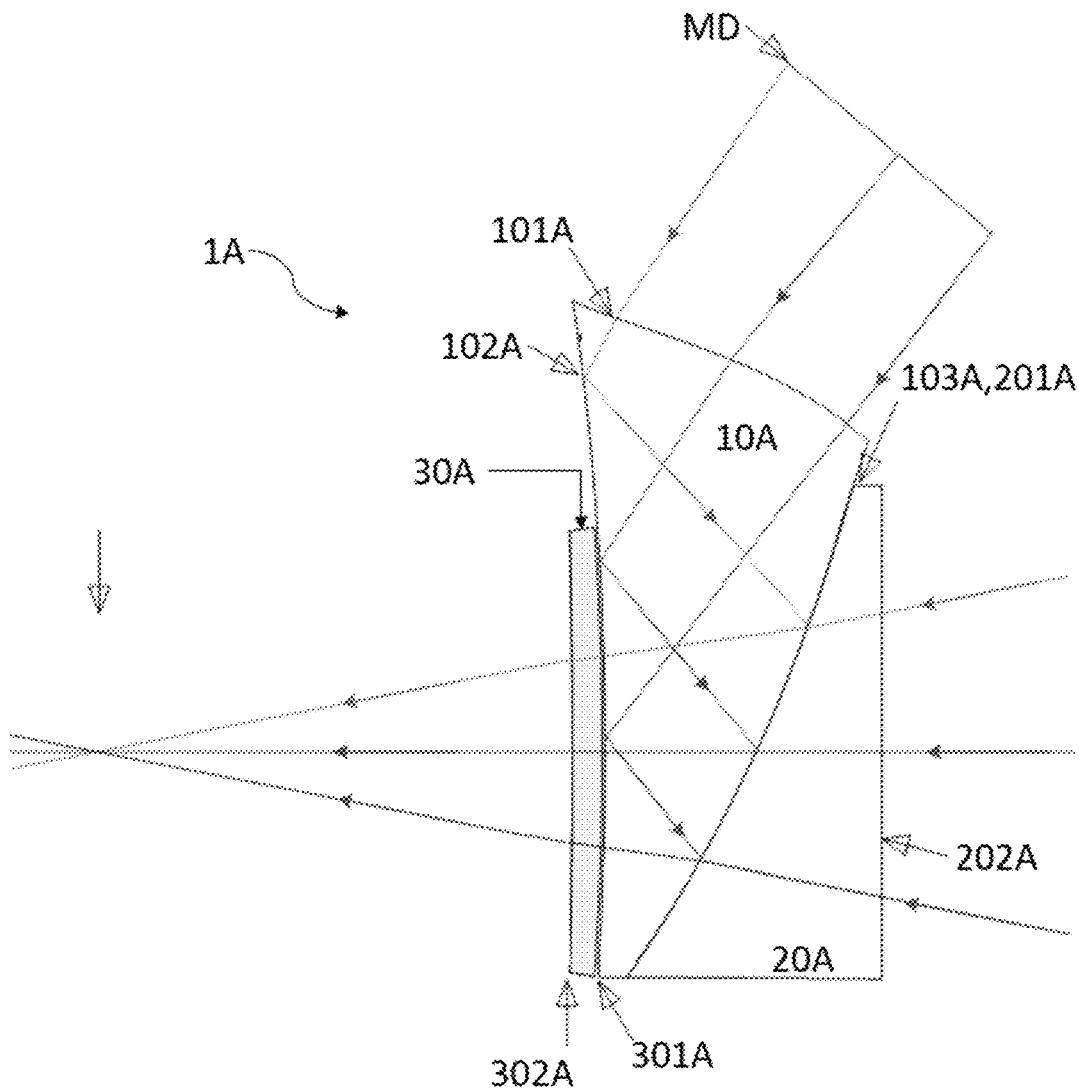
FIG. 5 schematically illustrates the cross-section of the freeform prism-lens group according to some other embodiments.

FIG. 5 illustrates a structure according to some other embodiments, wherein the freeform prism-lens group 1A includes at least a freeform primary prism 10A having at least one freeform surface, and a first freeform auxiliary lens 20A having at least one freeform surface. Either the freeform primary prism 10A or the first freeform auxiliary lens 20A has at least two optical surfaces and other auxiliary surfaces to form a valid prism or lens shape. The freeform primary prism has at least three valid optical surfaces, namely 101A, 102A, and 103A. And by refraction and/or reflection effect of surfaces 101A to 103A, the displayed image is enlarged. The first freeform auxiliary lens 20A has a first optical surface 201A that is deposed proximal to the third optical surface 103A of the primary prism 10A and has a same shape with the third optical surface 103A. Different from the first embodiment, the first freeform auxiliary lens 20A has a second optical surface 202A distal from the primary prism, which is aspheric, or smooth spherical with a radius of curvature greater than 100 mm.

Similar to the first embodiment, the freeform prism-lens group 1A also includes a second auxiliary lens 30A which is placed on the other side of the freeform primary prism 10A, i.e., the first freeform auxiliary lens 20A and the second auxiliary lens 30A are on different sides of the freeform primary prism 10A. The freeform prism-lens group 1A may be used to further correct aberrations and improve the imaging quality of the environmental light rays. The first optical surface 201A of the first freeform auxiliary lens 20A may have an identical shape with the third optical surface 103A of the primary prism 10A and may be cemented to the third optical surface 103A. The first surface 301A of the second auxiliary lens 30A may have an identical freeform shape with the second freeform surface 102A of the primary prism 10A and there may be a predetermined thin air gap between the first surface 301A and the second optical surface 102A. The second auxiliary lens 30A can be easily removable coupled to the freeform primary prism 10A.

Since the second optical surface 202A is spherical or aspheric, for the modified embodiment, the shape of the second surface 302A of the second auxiliary lens 30A is optimally not limited. The second surface 302A of the second auxiliary lens 30A which can match different vision users may be manufactured further. For users with normal visual ability, the second surface 302A may have an identical shape with the second optical surface 202A. And for user with certain amount of myopia or hyperopia and/or astigmatism, the above-mentioned amount of diopter compensation is realized by the difference in the shapes of the second surface 302A and the second optical surface 202A. In addition, the second auxiliary lens 30A can be replaced if severe abrasion occurs or the visual ability of the user changes, for the second auxiliary lens 30A is removable. Hence, the cost of the freeform prism-lens group 1A for different visual ability users is reduced and the service life of the freeform prism-lens group 1A is prolonged.

Figure 6:
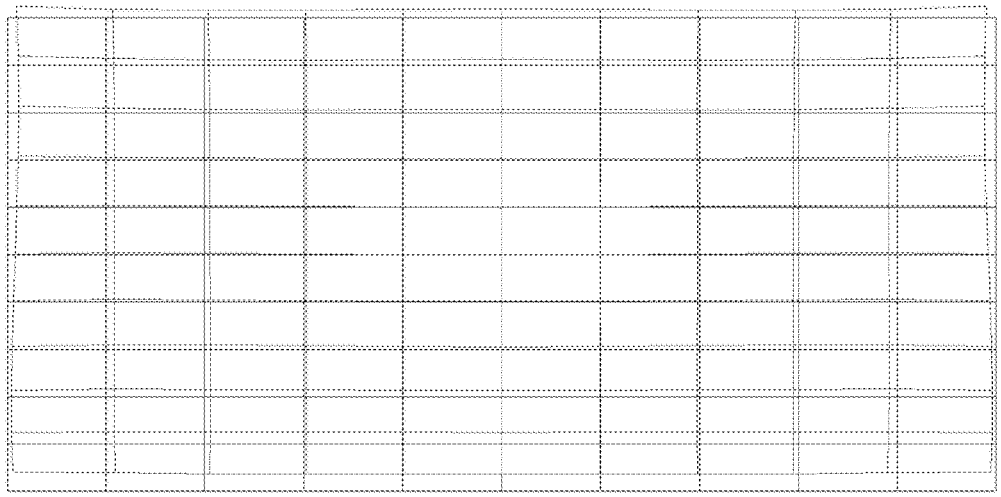
FIG. 6 illustrates the distortion of the displayed image using the freeform prism-lens group in FIG. 5.

Similar to the first embodiment, the freeform surfaces in the modified embodiment may be described by SPS XYP. As shown in table 3 (the surface parameters of the modified embodiment for users with normal visual ability), for the modified embodiment, the air gap between the second auxiliary lens 30A and the freeform primary prism 10A is 0.4 mm. The maximum thickness of the freeform prism-lens group 1A is not greater than 15 mm when measured from the second optical surface 202A of the first freeform auxiliary lens 20A to the second surface 302A of the second auxiliary lens 30A. The field-of-view of the modified embodiment is larger than 50°. For the light from MD, the distortion image of the freeform prism-lens group 1 on EPD modified is illustrated in FIG. 6.

Similar to the first embodiment, the dimension of the freeform prism-lens group 1A can be scaled, if only the front surface 302A and the back surface 202A are spherical surfaces with a curvature of greater than 100 mm or aspheric surfaces.

TABLE 3

| Surface | Radius of curvature (mm) |
| --- | --- |
| 302A, 202A | −500, −300, −250, −150, or −80 |
| 102A, 301A | −110.0294863 |
| 103A, 201A | −27.5533493 |
| 101A | 22.17088364 |
| MD | Planar (∞) |

TABLE 4

|  | surface 103A |  |
| --- | --- | --- |
| X | 0 | 0 |
| Y | 0 | 0 |
| $X^2$ | 0.007597 | −0.01624 |
| XY | 0 | 0 |
| $Y^2$ | 0.008138 | 0.218469 |
| $X^3$ | 0 | 0 |
| $X^2Y$ | 5.67E−05 | 0.00457 |
| $XY^2$ | 0 | 0 |
| $Y^3$ | 1.77E−05 | 0.030221 |
| $X^4$ | 5.74E−06 | −0.00063 |
| $X^3Y$ | 0 | 0 |
| $X^2Y^2$ | 1.74E−05 | −0.00142 |
| $XY^3$ | 0 | 0 |
| $Y^4$ | −1.69E−06 | 0.001379 |
| $X^5$ | 0 | 0 |
| $X^4Y$ | 3.92E−08 | −0.00033 |
| $X^3Y^2$ | 0 | 0 |

TABLE 4-continued

| | surface 103A | |
|---|---|---|
| $X^2Y^3$ | 9.83E−07 | −0.00043 |
| $XY^4$ | 0 | 0 |
| $Y^5$ | 1.76E−07 | −1.09E−05 |
| $X^6$ | −1.66E−08 | 4.19E−06 |
| $X^5Y$ | 0 | 0 |
| $X^4Y^2$ | −3.60E−07 | −5.99E−05 |
| $X^3Y^3$ | 0 | 0 |
| $X^2Y^4$ | −4.00E−07 | −3.21E−05 |
| $XY^5$ | 0 | 0 |
| $Y^6$ | 2.81E−07 | −5.79E−07 |
| $X^7$ | 0 | 0 |
| $X^6Y$ | −4.87E−09 | 2.09E−06 |
| $X^5Y^2$ | 0 | 0 |
| $X^4Y^3$ | −1.60E−08 | −5.22E−06 |
| $X^3Y^4$ | 0 | 0 |
| $X^2Y^5$ | −1.46E−08 | 7.02E−07 |
| $XY^6$ | 0 | 0 |
| $Y^7$ | −4.47E−09 | 3.18E−07 |
| $X^8$ | 5.60E−10 | −1.09E−08 |
| $X^7Y$ | 0 | 0 |
| $X^6Y^2$ | 3.50E−09 | 2.77E−07 |
| $X^5Y^3$ | 0 | 0 |
| $X^4Y^4$ | 1.25E−08 | −2.40E−07 |
| $X^3Y^5$ | 0 | 0 |
| $X^2Y^6$ | 2.26E−09 | 1.90E−07 |
| $XY^7$ | 0 | 0 |
| $Y^8$ | −6.03E−09 | 7.84E−09 |
| $X^9$ | 0 | 0 |
| $X^8Y$ | 3.09E−11 | −5.33E−09 |
| $X^7Y^2$ | 0 | 0 |
| $X^6Y^3$ | 8.49E−11 | 1.77E−08 |
| $X^5Y^4$ | 0 | 0 |
| $X^4Y^5$ | 1.53E−10 | −6.81E−09 |
| $X^3Y^6$ | 0 | 0 |
| $X^2Y^7$ | 7.69E−11 | 7.04E−09 |
| $XY^8$ | 0 | 0 |
| $Y^9$ | 2.85E−11 | −1.10E−09 |
| $X^{10}$ | −3.36E−12 | −1.56E−11 |
| $X^9Y$ | 0 | 0 |
| $X^8Y^2$ | −9.91E−12 | −2.88E−10 |
| $X^7Y^3$ | 0 | 0 |
| $X^6Y^4$ | −7.39E−11 | 5.08E−10 |
| $X^5Y^5$ | 0 | 0 |
| $X^4Y^6$ | −7.65E−11 | −1.49E−10 |
| $X^3Y^7$ | 0 | 0 |
| $X^2Y^8$ | 1.03E−11 | 4.54E−11 |
| $XY^9$ | 0 | 0 |
| $Y^{10}$ | 3.95E−11 | −4.27E−11 |

Figure 7:
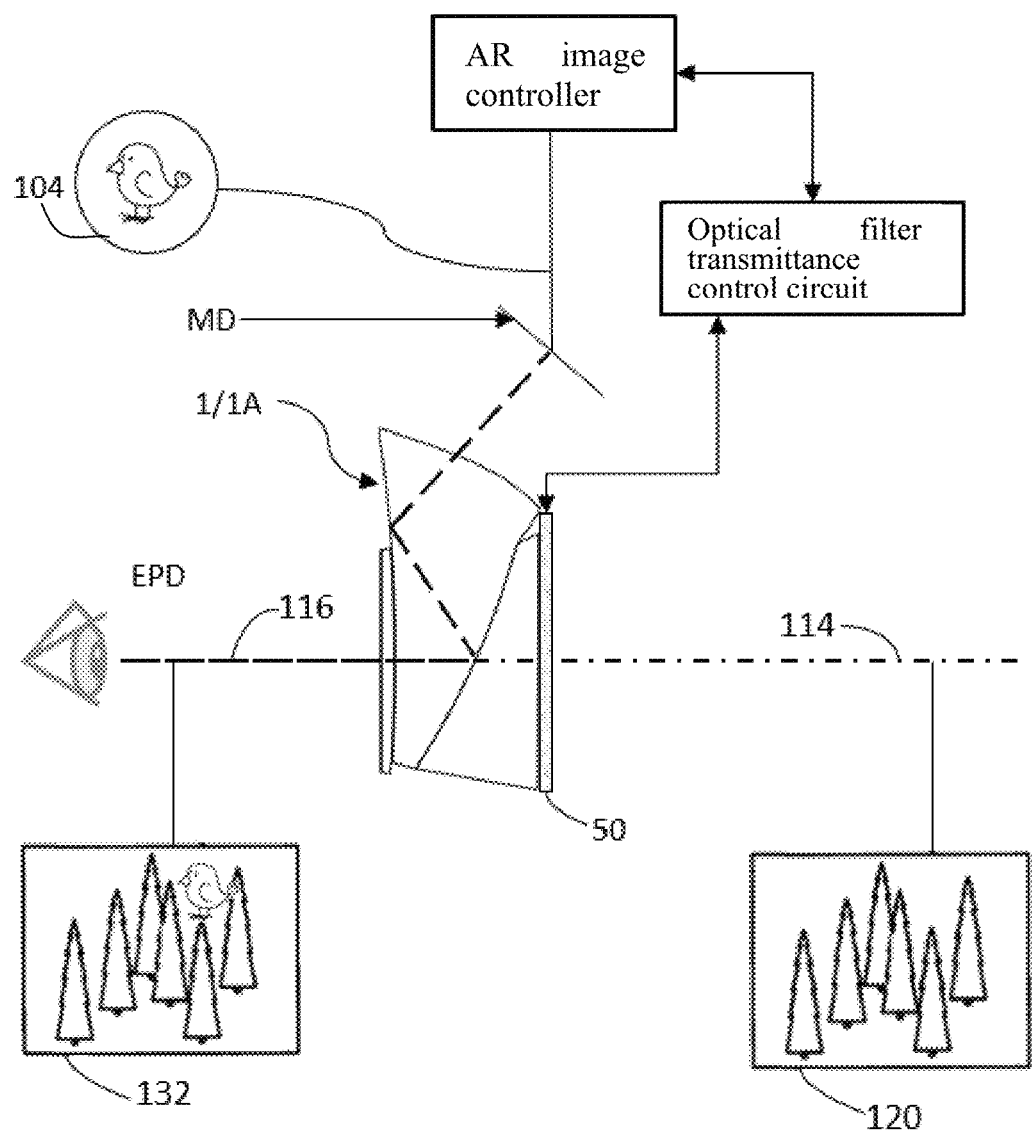
FIG. 7 illustrates the NED apparatus with freeform prism-lens according to some embodiments.

In another aspect of the disclosure, the freeform prism-lens group 1/1A in the first embodiment and the modified embodiment can be utilized as the optical system of an NED apparatus. FIG. 7 illustrates a typical application of optical see-through NED apparatus, e.g., head-mounted display (HMD) wherein the freeform prism-lens group 1/1A and the micro-display MD in the first embodiment or the other embodiments may be included. The freeform prism-lens group 1/1A is placed in front of one eye, and usually a pair of freeform prism-lens groups 1/1A are utilized for two eyes. Due to the effect of beamsplitter in the freeform prism-lens group 1/1A, light rays from the real-world scene (i.e., the environmental light rays), e.g., ray 114, and the rays from the micro-display MD, e.g., ray 116, will be synthesized at the position of the eye, so the image 132 is observed by the eye. In image 132, part of the real scene 120, e.g. the grove, and the image 104 for augmented reality from the micro-display MD, e.g. birds that are not in real existence, can be observed. In the field of entertainment, images that are not in close relation to the real scene may be augmented. For example, birds may be replaced by dolphins, so that a fantasy scene where dolphins are leaping among the grove can be observed. In the field of advertisement, the augmented images of particular objects or goods may be displayed to the user, e.g., a bottle of soft drink on table. The NED apparatus in the disclosure may have applications in many other fields.

In general, a user may wear HMD anywhere, like indoor or outdoor. Various information can be collected to determine the type of the augmented image to be displayed and the position of the augmented image to be displayed. For example, the position of the user, the visual direction of the user, and the position of floor, wall or maybe furniture (in the indoor situation) may be used to determine where the augmented image is to be placed in a proper place of the environmental light. The location of the user's head may be obtained by pose tracking and inertial units which may be mounted on the head of the user (e.g. on the NED in this disclosure), and then the visual direction of the user is determined. One or more depth cameras may be used by pose tracking to get the three-dimensional model of the user. Similarly, one or more depth cameras may be used to get the position of floor, wall, or other objects in the environment. Various sensors and controllers within the range of existent technology may be utilized to get all the data needed in the NED in this disclosure. The above-mentioned controller(s) may be in the range of general data processors and controllers, e.g., central processing units (CPUs) or other microprocessors. The above-mentioned controllers(s) may be placed near the sensors to facilitate signal transmission or data processing, or the above-mentioned controllers may be placed somewhere not so close to the freeform prism-lens group and the sensors and are connected to the sensors by data cables.

The micro-display MD can only add but not decrease the rays coming from the environmental light. Therefore, limited by the display principal and the brightness of the micro-display MD, dark colors may not be well displayed. Particularly, black pixel of the images cannot be augmented in the micro-display viewing path. When dark images are to be augmented in the environment, the user may still feel the translucent environment or feel the ghosted augmented images. In the circumstance of strong augmented reality or mixed reality, rays from the real scene are expected to be partially removed in order to display augmented images of any colors or brightness with a more vivid effect. To achieve this target, as simple way in the existent technology, the HMD may further include an optical filter to decrease the amount of the environmental light rays that comes into the HMD to improve the contrast of the augmented images. For example, the widely-used films with photochromic property may be added to reduce rays when the environmental light rays are too strong and to protect the eyesight. However, removal of rays from the whole environment is not accurate enough for more general applications, and it is expected to selectively remove the environmental light rays from particular field angles.

Because the surface 202/202A of the auxiliary lens 20/20A that is close to the environment has a planar or smooth shape, it is possible to add a controllable optical filter 50 which is attached on the surface 202/202A. The controllable optical filter 50 may be in the form of a transmitting LCD panel, electrochromic film, or other controllable optical filter devices. The above-mentioned transmitting LCD panel may be obtained by removing substrates, backlights, and scattering layers from traditional LCDs. The above-mentioned LCD panel may include one or more transmitting LCD chips, wherein LCD chips control the amount of rays passing through. For example, this kind of LCD chips are used in projectors. The controllable optical filter 50 may include grids of pixels, wherein the transmittance of each pixel can be controlled individually between the minimum transmittance and the maximum transmittance. Ideally, the minimum transmittance is zero and the maximum transmittance is 100%, but a limited range between these two values is acceptable. For example, a monochromatic LCD panel with not more than two polarized filters may have a transmittance range of 50%-20% or 10% for each pixel, and the maximum resolution is same as the LCD panel. At the minimum of 50%, the controllable optical filter 50 may seem slightly colored, and this is acceptable. It's ideal that the highest transmittance for the above-mentioned LCD panel is set to be 100%. In practice, a parameter, alpha, which is between 0-100% may be determined, where 0 is the lowest transmittance achievable (i.e., the opaquest) and 100% corresponds to the highest transmittance achievable (i.e. the most transparent). Each pixel may be assigned an alpha value by the optical filter transmittance control circuit.

In the scene rendering for augmented objects, it should be noted which part of the real scene is in front of the augmented objects. If the augmented object is front of the real scene, the pixels on the corresponding area on the controllable optical filter 50 will have zero or low alpha values, wherein the corresponding real scene is obscured to avoid undesired rays that disturbs the augmented objects. If the augmented object is to be behind the real scene, the alpha values of the pixels on the controllable optical filter 50 are set to be 100% or high to make rays of the real scene enter the NED system, and pixels on the corresponding area of the micro-display MD are shut off. Since the corresponding area may be pixel-based, the situation that part of the augmented object is front of the real scene, part of the augmented object is to be behind the real scene and part of the augmented object is overlap with real scene can be handled. To improve the stability of the augmented image, the alignment of the extra pixels of the transmittance of controllable optical filter and the augmented image is maintained. The correspondence of the pixels may refer to the condition where pixels on the controllable optical filter 50 match the pixels on the micro-display MD. In more detail, each pixel on the controllable optical filter 50 attached on surface 202/202A may have an identical-sized with the pixel on the micro-display MD, and the controllable optical filter 50 and the micro-display MD are driven simultaneously.

The controllable optical filter 50 may be controlled by environmental light ray sensors placed on the enclosure of the NED. When the environmental light rays are too strong, the transmittance of the controllable optical filter 50 may decrease independently from the augmented images displayed by the micro-display MD. The optical filter transmittance control circuit may be the CPU or other microprocessors of the NED, or may be an extra control circuit that can communicate with the CPU of the NED.

Moreover, the transmittance of the controllable optical filter 50 may react to the feedback of other sensors, e.g., eye-tracker which can be fulfilled by a camera placed inside of the enclosure of the NED to track the position of the eye relative to the enclosure of the NED. In general, eye-tracking involves the capture of eye images and computer vision technology that determines the position of the pupil relative to the eye socket. Another eye tracking method may use one or more photo detectors and a LED array. By a known position of the tracing camera, the position of the eye relative to any other stable object (e.g., the controllable optical filter 50 or the freeform prism-lens group 1/1A) on the enclosure may be obtained. In most cases, it is enough to track one of the two eyes, since two eyes move consistently. But it is possible to track each eye separately and determine the position where the augmented image is to be displayed according to the position of each eye.

The AR image controller may also react to the feedback of the environmental light ray sensor and/or the eye tracker, and enhance the control to the augment image. For example, the brightness of image displayed on the micro-display MD may be adjusted according to the above-mentioned feedback.

The controllable optical filter 50 is in its maximum transmittance condition for the environmental light ray see-through path when no augmented image is displayed. When the controllable optical filter 50 is not driven simultaneously with the micro-display MD, e.g., the controllable optical filter 50 is kept to block all rays from the environmental light, all the rays that enters the eye comes from the micro-display MD viewing path. Thus, the NED in this disclosure works as a HMD for virtual reality. That means an optical see-through HMD.

According to the freeform prism-lens group and the NED apparatus thereof in this disclosure, the auxiliary lenses need not to be specially designed when the design of the primary prism is finished, and the design difficulties in the design of surfaces are thus decreased. The front and back optical surfaces of the prism-lens group are planar or close to planar, which facilitates the protective measures aimed to improve the durability and attachment of additional elements without the increase of maximum thickness of the freeform prism-lens group. In the NED apparatus, controllable optical filter may achieve pixel-level control of transmittance, which may effectively decrease the influence of the environmental light rays on the augmented images, and thus a more vivid and accurate synthesized image can be observed by the eye.

These and other advantages of embodiments of the present disclosure will be apparent to those skilled in the art from the foregoing specification. Accordingly, it will be recognized by skilled in the art that changes or modifications may be made to the above-described embodiments without departing from the broad inventive concepts of the disclosure.

What is claimed is:

1. A free-form prism-lens group, comprising: a primary prism, a first auxiliary lens, and a second auxiliary lens; wherein:
    the primary prism has a plurality of surfaces including only three optical surfaces;
    a first optical surface is configured as an incident surface facing a micro-display device for receiving an image light from the micro-display device, and transmitting the image light into the primary prism;
    a second optical surface is configured as an exit surface;
    a third optical surface is configured to reflect the image light back into the primary prism once during a process of the image light propagated from the first optical surface to the second optical surface and exiting from the primary prism;
    the first optical surface, the second optical surface, and the third optical surface are free-form surfaces;
    the first auxiliary lens is arranged adjacent to the primary prism and is not configured for imaging of the image light;
    the second auxiliary lens is arranged adjacent to the primary prism and a gap with a predetermined thickness is arranged between the second auxiliary lens and the primary prism, and the adjacent surfaces of the primary prism and the second auxiliary lens have consistent free-form surfaces to satisfy the condition of total internal reflection of the image light when the image light reaches the second optical surface for a first time;

the second auxiliary lens extends in a direction perpendicular to an optical axis to cover an effective aperture of the image light entering the second auxiliary lens from the primary prism; and the primary prism has extended edge portions disposed symmetrically about a vertical plane passing through the optical axis and extending from the first optical surface and the third optical surface, respectively, such that the freeform prism-lens group has a size not limited by the micro-display device, the extended edge portions have non-free-form surfaces and are not configured as optical surfaces for imaging of the image light while having smooth transitions with the first optical surface and the third optical surface, respectively.

2. The free-form prism-lens group of claim 1, wherein the free-form prism-lens group has an outer surface facing an environment side and an outer surface facing the exit pupil side, the outer surface facing the environment side and the outer surface facing the exit pupil side are planar, aspheric, or spherical with a curvature radius greater than 100 mm.

3. The free-form prism-lens group of claim 2, wherein the outer surface facing the environment side and the outer surface facing the exit pupil side are spherical surfaces or aspherical surfaces, and the outer surface facing the environment side have a different shape with the outer surface facing the exit pupil side, thereby adding a predetermined diopter compensation to environmental light.

4. The free-form prism-lens group of claim 2, wherein the outer surface facing the environment side has an identical shape as the outer surface facing the exit pupil side, such that environmental light does not change direction after passing through the free-form prism-lens group.

5. The free-form prism-lens group of claim 2, wherein the outer surface facing the environment side and the outer surface facing the exit pupil side are coated with hardening films and anti-reflection films.

6. The free-form prism-lens group of claim 1, wherein the first auxiliary lens is coupled to the primary prism by gluing.

7. The free-form prism-lens group of claim 1, wherein predetermined thickness of the gap is not more than 1 mm.

8. The free-form prism-lens group of claim 1, wherein the third optical surface of the primary prism is coated with a beamsplitter film having a predetermined beamsplitting ratio.

9. The free-form prism-lens group of claim 1, wherein the first auxiliary lens and the second auxiliary lens do not exceed an outer edge of the primary prism in the direction of the optical axis, so that a maximum thickness of the free-form prism-lens group in the direction of the optical axis is determined by a maximum thickness of the outer edge of the primary prism.

10. The free-form prism-lens group of claim 9, wherein the maximum thickness does not exceed 15 mm.

11. The free-form prism-lens group of claim 1, wherein the free-form prism-lens group is capable of enlarging the image displayed by the micro-display device to achieve a field of view of more than 50°.

12. A near-eye display apparatus, comprising:
the free-form prism-lens group of claim 1; and
the micro-display device, positioned over the first optical surface of the primary prism;
wherein the apparatus is further configured to have a dioptric correction of a user vision with at least one of myopia, hyperopia, or astigmatism.

13. The near-eye display apparatus of claim 12, further comprising a controller and a controllable optical filter, wherein the controllable optical filter is attached to an outer surface facing an environment side of the free-form prism-lens group, wherein the controllable optical filter is coupled to the controller and is driven with the micro-display synchronously.

14. The near-eye display apparatus of claim 12, wherein the free-form prism-lens group has an outer surface facing an environment side and an outer surface facing the exit pupil side, the outer surface facing the environment side and the outer surface facing the exit pupil side are planar, aspheric, or spherical with a curvature radius greater than 100 mm.

15. The near-eye display apparatus of claim 14, wherein the outer surface facing the environment side and the outer surface facing the exit pupil side are spherical surfaces or aspherical surfaces, and the outer surface facing the environment side have a different shape with the outer surface facing the exit pupil side, thereby adding a predetermined diopter compensation to the environmental light.

16. The near-eye display apparatus of claim 14, wherein the outer surface facing the environment side has an identical shape as the outer surface facing the exit pupil side, such that environmental light does not change direction after passing through the free-form prism-lens group.

17. The near-eye display apparatus of claim 14, wherein the outer surface facing the environment side and the outer surface facing the exit pupil side are coated with hardening films and anti-reflection films.

18. The near-eye display apparatus of claim 12, wherein the first auxiliary lens is coupled to the primary prism by gluing.

19. The near-eye display apparatus of claim 12, wherein the predetermined thickness of the gap is not more than 1 mm.

20. The free-form prism-lens group of claim 1, wherein the free-form prism-lens group is further configured to have a dioptric correction for user vision with at least one type of myopia, hyperopia, or astigmatism.

* * * * *